(12) United States Patent
Ito et al.

(10) Patent No.: US 8,428,939 B2
(45) Date of Patent: Apr. 23, 2013

(54) VOICE MIXING DEVICE, NOISE SUPPRESSION METHOD AND PROGRAM THEREFOR

(75) Inventors: Hironori Ito, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 699 days.

(21) Appl. No.: 12/670,843

(22) PCT Filed: Jul. 28, 2008

(86) PCT No.: PCT/JP2008/063507
§ 371 (c)(1),
(2), (4) Date: Jan. 26, 2010

(87) PCT Pub. No.: WO2009/020001
PCT Pub. Date: Feb. 12, 2009

(65) Prior Publication Data
US 2010/0228545 A1    Sep. 9, 2010

(30) Foreign Application Priority Data
Aug. 7, 2007    (JP) ................................. 2007-205443

(51) Int. Cl.
*G10L 21/00*    (2006.01)
(52) U.S. Cl.
USPC ........................ 704/226; 704/200; 379/202.01
(58) Field of Classification Search .................. 704/200, 704/226; 379/202.01
See application file for complete search history.

(56) References Cited

U.S. PATENT DOCUMENTS

| 6,212,275 B1 * | 4/2001 | Akhteruzzaman ............ 379/421 |
| 7,383,178 B2 * | 6/2008 | Visser et al. ................... 704/227 |
| 8,218,751 B2 * | 7/2012 | Hepworth et al. ....... 379/204.01 |
| 2010/0217585 A1 * | 8/2010 | Karlsson et al. .............. 704/219 |

FOREIGN PATENT DOCUMENTS

| JP | 7-123157 A | 5/1995 |
| JP | 10-75310 A | 3/1996 |
| JP | 11-205460 A | 7/1999 |
| JP | 2005269347 A | 9/2005 |
| JP | 2007060460 A | 3/2007 |
| JP | 2007096555 A | 4/2007 |

OTHER PUBLICATIONS

International Search Report for PCT/JP2008/063507 mailed Sep. 10, 2008.
K. Yamato et al., "Post Processing Noise Suppressor with Adaptive Gain-Flooring for Cell-Phone Handsets and IC Recorders": International Conference on Consumer Electronics (ICCE), 2007, pp. 1-2.

* cited by examiner

*Primary Examiner* — Daniel D Abebe

(57) ABSTRACT

A voice mixing device for mixing a plurality of voice signals, comprises: a speaker selection unit selecting at least one voice signal among said plurality of voice signals; a full signal adder unit adding all of at least one voice signal selected by said speaker selection unit; respective subtractor unit subtracting only one of said selected voice signals from an addition result of said full signal adder unit; a common noise suppression unit suppressing noise of a common voice signal, being an addition result of said full signal adder unit; individual noise suppression unit suppressing noise of respective individual voice signals, being subtraction results of said subtractor unit; and memory switching unit copying information of noise suppression obtained in said common noise suppression unit based on a selection result of said speaker selection unit, to information of noise suppression in said individual noise suppression unit.

11 Claims, 4 Drawing Sheets

VOICE MIXING DEVICE, NOISE SUPPRESSION METHOD AND PROGRAM THEREFOR

REFERENCE TO RELATED APPLICATION

This application is the National Phase of PCT/JP2008/063507, filed Jul. 28, 2008, which is based upon and claims the benefit of the priority of Japanese patent application No. 2007-205443, filed on Aug. 7, 2007, the disclosure of which is incorporated herein in its entirety by reference thereto.

TECHNICAL FIELD

This invention relates to a voice mixing device, a noise suppression method and program therefor, and in particular, to technology for suppressing noise superimposed on voice in a multipoint conference.

BACKGROUND ART

In a multipoint conference service, voice data of each participant is transmitted to a multipoint conference server. The multipoint conference server transmits to each participant a voice signal that is a mixed voice signal of all other participants. FIG. 4 is a drawing showing a typical configuration example with regard to a voice mixing device for a multipoint conference (refer to Patent Documents 1 and 2). In FIG. 4, with the number of participants in the conference as M (M being a positive integer greater than or equal to 2), a voice signal for a 1st, 2nd, . . . M-th speaker is inputted from respective voice input terminals 501, 502, . . . 50M. The respective input voice signals are inputted to a full adder 520 and adders 531, 532, . . . 53M, respectively. The full adder 520 outputs a voice signal, obtained by adding all input voice signals, to the adders 531, 532, . . . 53M. The adders 531, 532, . . . 53M subtract voice signals respectively inputted thereto from the voice signal inputted from the full adder 520, and output the subtracted voice signals to voice output terminals 571, 572, . . . 57M, respectively. According to this type of voice mixing device, it is possible to mix and listen to voice signals of people other than one's self.

However, in the multipoint conference service, particularly in cases in which participants are using mobile telephones, background noise is often superimposed on the voice signals. In such types of mobile telephones and the like, noise suppression processing is effective. As an example of noise suppression processing, a method is known in which, after performing frequency domain analysis with respect to input voice by Fourier transform or the like, superimposed noise is estimated, and a noise component is subtracted from the input voice (for example, refer to non-Patent Document 1).
[Patent Document 1]
 JP Patent Kokai Publication No. JP-P2005-269347A
[Patent Document 2]
 JP Patent Kokai Publication No. JP-A-10-75310
[Non-Patent Document 1]
 Yamato Kazuhiro, Sugiyama Akihiko, Kato Masanori, Post-Processing Noise Suppressor with Adaptive Gain-Flooring for Cell-Phone Handsets and IC Recorders, International Conference on Consumer Electronics (ICCE), 2007, pp. 1-2.

SUMMARY

The entire disclosures of the abovementioned Patent Documents 1 and 2, and Non-Patent Document 1 are incorporated by reference into the present application. Below, analysis of related technology according to the present invention is given.

In a multipoint conference service, particularly in cases in which participants are using mobile terminals, background noise is often superimposed on voice signals. Therefore, with regard to received voice signals of each participant, it is preferable to perform voice mixing, after carrying out noise suppression processing. In noise suppression processing, estimation and smoothing processing of background noise is carried out based on retained past information.

Since conventional multipoint conferencing is configured such that noise suppression processing is performed on speech of all participants, computation amount with regard to noise suppression processing may increase along with increasing participants. As a method for solving this, a method can be conceived in which a speaker who makes an utterance is detected, and by mixing only a voice signal of the detected speaker, the number of noise suppression processes that are activated is reduced.

However, when noise suppression processing is applied to this method, a nonconformity occurs among past noise suppression information retained in the noise suppression processing, so that there is a risk of an abnormal sound being generated, counted as a problem.

It is an object of the present invention to provide a voice mixing device, a noise suppression method and program therefor, which will eliminate the problem.

According to one aspect of the present invention, there is provided a voice mixing device for mixing a plurality of voice signals. The voice mixing device is provided with a speaker selection unit selecting at least one voice signal among the plurality of voice signals; a full signal adder unit for adding all of at least one voice signal selected by the speaker selection unit; respective subtractor unit subtracting only one of the selected voice signals from an addition result of the full signal adder unit; a common noise suppression unit suppressing noise of a common voice signal, being an addition result of the full signal adder unit; individual noise suppression unit suppressing noise of respective individual voice signals, being subtraction results of the subtractor unit; and a memory switching unit copying information of noise suppression obtained in the common noise suppression unit based on a selection result of the speaker selection unit, to information of noise suppression in the individual noise suppression unit.

The voice mixing device of the present invention may be further provided with a voice data switching unit switching and outputting a voice signal in which noise is suppressed, obtained by either of the common noise suppression unit and the individual noise suppression unit, based on a selection result of the speaker selection unit.

The voice mixing device of the present invention may be further provided with a preliminary noise suppression unit enabling selection as to whether or not to perform noise suppression on each of the plurality of voice signals.

In the voice mixing device of the present invention, the speaker selection unit may select the at least one voice signal based on power of the voice signal.

In the voice mixing device of the present invention, the speaker selection unit may select the at least one voice signal based on whether the voice signal is voiced or unvoiced.

A multipoint conference system of the present invention may be provided with the abovementioned voice mixing device.

According to another aspect of the present invention, there is provided a noise suppression method used in a voice mixing device for mixing a plurality of voice signals. The method comprises a first step i.e., selecting at least one voice signal among the plurality of voice signals; a second step i.e., adding all of at least one voice signal selected in the first step; a third step i.e., subtracting only one of the selected voice signals from an addition result of the second step; a fourth step i.e., suppressing noise of a common voice signal, being an addition result of the second step; a fifth step i.e., suppressing noise of an individual voice signal, being a subtraction result of the third step; and a sixth step i.e., copying information of noise suppression obtained in the fourth step based on a selection result of the first step, to information of noise suppression of the fifth step.

The noise suppression method of the present invention may further include a seventh step i.e., switching and outputting a voice signal in which noise is suppressed, obtained in either of the fourth step and the fifth step, based on the selection result of the first step.

The noise suppression method of the present invention may further include an eighth step i.e., selecting whether or not to perform noise suppression on each of the plurality of voice signals, before the first step.

In the noise suppression method of the present invention, in the first step, the at least one voice signal may be selected based on power of the voice signal.

In the noise suppression method of the present invention, in the first step, the at least one voice signal may be selected based on whether the voice signal is voiced or unvoiced.

According to a further aspect of the present invention, there is provided a program which makes a computer, including a voice mixing device for mixing a plurality of voice signals, execute the following processing. The processing comprises a first step i.e., selecting at least one voice signal among the plurality of voice signals; a second step i.e., adding all of at least one voice signal selected in the first step; a third step i.e., subtracting only one of the selected voice signals from an addition result of the second step; a fourth step i.e., suppressing noise of a common voice signal, being an addition result of the second step; a fifth step i.e., suppressing noise of an individual voice signal, being a subtraction result of the third step; and a sixth step i.e., copying information of noise suppression obtained in the fourth step based on a selection result of the first step, to information of noise suppression of the fifth step.

The program of the present invention may be further made to execute a seventh step i.e., switching and outputting a voice signal in which noise is suppressed, obtained in either of the fourth step and the fifth step, based on a selection result of the first step.

The program of the present invention may be further made to execute an eighth step i.e., selecting whether or not to perform noise suppression on each of the plurality of voice signals, before the first step.

In the program of the present invention, in the first step, the at least one voice signal may be selected based on power of the voice signal.

In the program of the present invention, in the first step, the at least one voice signal may be selected based on whether the voice signal is voiced or unvoiced.

According to the present invention, when noise suppression unit is switched along with switching of a speaker, since information of noise suppression after switching is the same as information of noise suppression before switching, it is possible to reduce generation of abnormal sound.

Figure 1:
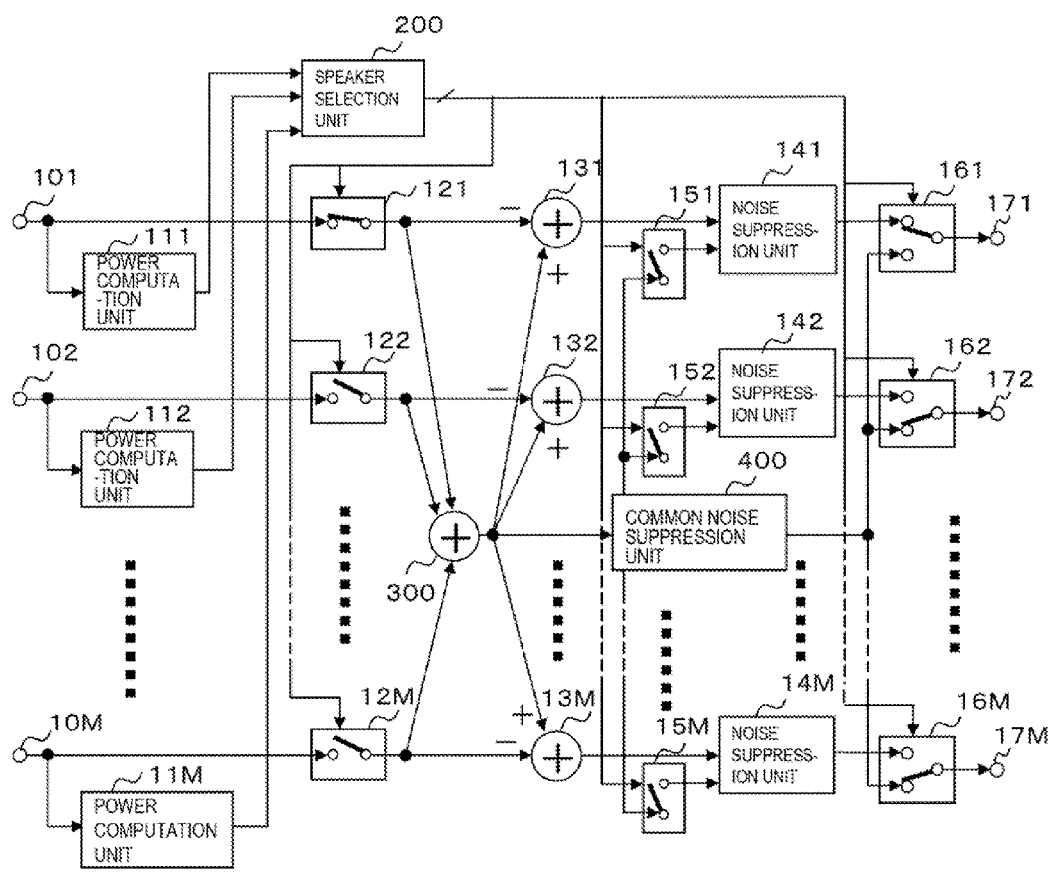
FIG. 1 is a drawing showing a configuration of a voice mixing device according to a first exemplary embodiment of the present invention.

EXPLANATIONS OF SYMBOLS 101, 102, . . . 10M voice input terminals
111, 112, . . . 11M power computation units
121, 122, . . . 12M voice signal input switching units
131, 132, . . . 13M adders
141, 142, . . . 14M, 191, 192, . . . 19M noise suppression units
151, 152, . . . 15M memory switching units
161, 162, . . . 16M voice data switching units
171, 172, . . . 17M voice output terminals
181, 182, . . . 18M noise suppression switching units
200 speaker selection unit
300 full (all) signal adder
400 common noise suppression unit

PREFERRED MODES

A voice mixing device according to an exemplary embodiment of the present invention is composed of M power computation units, a speaker selection unit, M voice signal input switching units, a full signal adder unit, a common noise suppression unit, M adders, M noise suppression units, M memory switching units, and M output voice data switching units, and performs a voice mixing operation including noise suppression processing for a multipoint conference.

The power computation unit computes power for respective input voice signals of M persons, to be outputted to the speaker selection unit. The speaker selection unit selects a speaker who makes an utterance based on the inputted power of each speaker. Next, all the selected speaker input voice signals are mixed by the full signal adder unit, and the mixed voice signal is inputted to the common noise suppression unit.

The common noise suppression unit outputs a voice signal in which noise included in the input voice signal is suppressed. Meanwhile, a voice signal in which voice signals of each selected speaker are subtracted from the mixed voice by an adder is inputted to the noise suppression units. The noise suppression units output voice signals in which noise included in the inputted voice signal is suppressed. The memory switching unit copies past information of the common noise suppression unit to the noise suppression units, based on a selection result of the speaker selection unit. The output voice data switching units perform switching of voice signals to be outputted based on the selection result of the speaker selection unit.

According to the above type of voice mixing device, when a noise suppression unit is switched along with switching of a speaker, information regarding past background noise held by the noise suppression unit after switching is the same as information held by the noise suppression unit before switching. Therefore, it is possible to prevent generation of an abnormal sound, which is a change in noise accompanying switching. This type of device is suitable for a multipoint conference system or a multipoint conference server.

Below, a detailed description will be given referring to the drawings, according to exemplary embodiments.

First Exemplary Embodiment

FIG. 1 is a block diagram showing a configuration of a voice mixing device according to a first exemplary embodiment of the present invention (translation note: the term "voice" herein represents "speech voice" or "speech"). In FIG. 1, a multipoint conference system is provided with voice input terminals 101, 102, ... 10M, power computation units 111, 112, ... 11M, a speaker selection unit 200, voice signal input switching units 121, 122, ... 12M, a full (all) signal adder 300, adders 131, 132, ... 13M, a common noise suppression unit 400, noise suppression units (individual noise suppression units) 141, 142, ... 14M, memory switching units 151, 152, ... 15M, voice data switching units 161, 162, ... 16M, and voice output terminals 171, 172, ... 17M.

The power computation units 111, 112, ... 11M compute power of voice signals inputted from the voice input terminals 101, 102, ... 10M respectively corresponding to speaker 1, speaker 2, ... and speaker M, to be outputted to the speaker selection unit 200. Computation of power P is performed using the following Expression (1), for each 20 milliseconds (160 samples), for an input voice signal s(n) at sampling of 8 kHz, for example.

$$P = \frac{1}{L}\sum_{n=0}^{L-1} s^2(n)$$ Expression (1)

Here, L=160.

The speaker selection unit 200 selects a voice signal corresponding to a speaker who makes an utterance using the computed power of the respective speakers, and outputs a selection result, that is, whether or not a voice signal is selected, to the respective voice signal input switching units 121, 122, ... 12M, the memory switching units 151, 152, ... 15M, and the voice data switching units 161, 162, ... 16M.

Here, as a method of selecting the speaker who makes an utterance, there is a method of selecting the top N speakers ($1 \leq N < M$) predetermined in order of size of voice signal power, and a method of selection a voice signal of power exceeding a predetermined threshold. Furthermore, a method may be considered in which, rather than using inputted power as it is, power inputted in the past is stored and a value which is a leaky integral in a certain time is used. In addition, a voice signal may be selected based on whether the voice signal is voiced or unvoiced.

The voice signal input switching units 121, 122, ... 12M perform switching as to whether or not to output respective input voice signals, based on a selection result of the speaker selection unit 200. Voice signals selected by the speaker selection unit 200 are respectively outputted to corresponding adders 131, 132, ... 13M, and also outputted to the full signal adder 300.

The full signal adder 300 adds all voice signals for speakers selected by the speaker selection unit 200, to be outputted to the adders 131, 132, ... 13M, and the common noise suppression unit 400.

The adders 131, 132, ... 13M each subtract voice signals of their own selected speaker from the voice signal outputted from the full signal adder 300. That is, the adders 131, 132, ... 13M, for only voice signals corresponding to speakers selected by the speaker selection unit 200, subtract respective voice signals outputted from the voice signal input switching units 121, 122, ... 12M from the voice signal inputted from the full signal adder 300, to be outputted respectively to the noise suppression units 141, 142, ... 14M.

The common noise suppression unit 400 suppresses noise superimposed on voice signals outputted from the full signal adder 300, to be outputted to the voice data switching units 161, 162, ... 16M.

The noise suppression units 141, 142, ... 14M suppress noise superimposed on the voice signals outputted from the respective adders 131, 132, ... 13M. That is, the noise suppression units 141, 142, ... 14M suppress noise superimposed on voice signals only in cases in which the voice signals are inputted from the respective adders 131, 132, ... 13M, to be outputted to the respective voice data switching units 161, 162, ... 16M.

The memory switching units 151, 152, ... 15M copy information held by the common noise suppression unit 400 as noise suppression information, based on the selection result of the speaker selection unit 200 to respective noise suppression units 141, 142, ... 14M. That is, the memory switching units 151, 152, ... 15M copy past information held by the common noise suppression unit 400 to respective noise suppression units 141, 142, ... 14M, only in cases in which, in the speaker selection unit 200, there is a transition from a state in which a speaker who makes an utterance is not selected, to a state in which the speaker is selected.

The voice data switching units 161, 162, ... 16M perform switching of respective voice data to be outputted, based on a selection result of the speaker selection unit 200, to be outputted from the respective voice output terminals 171, 172, ... 17M. That is, the voice data switching units 161, 162, ... 16M output voice signals inputted from the respective noise suppression units 141, 142, ... 14M, in cases in which a speaker who makes an utterance has been selected in the speaker selection unit 200, and output voice signals inputted from the common noise suppression unit 400, in cases in which a speaker who makes an utterance has not been selected in the speaker selection unit 200.

Figure 2:
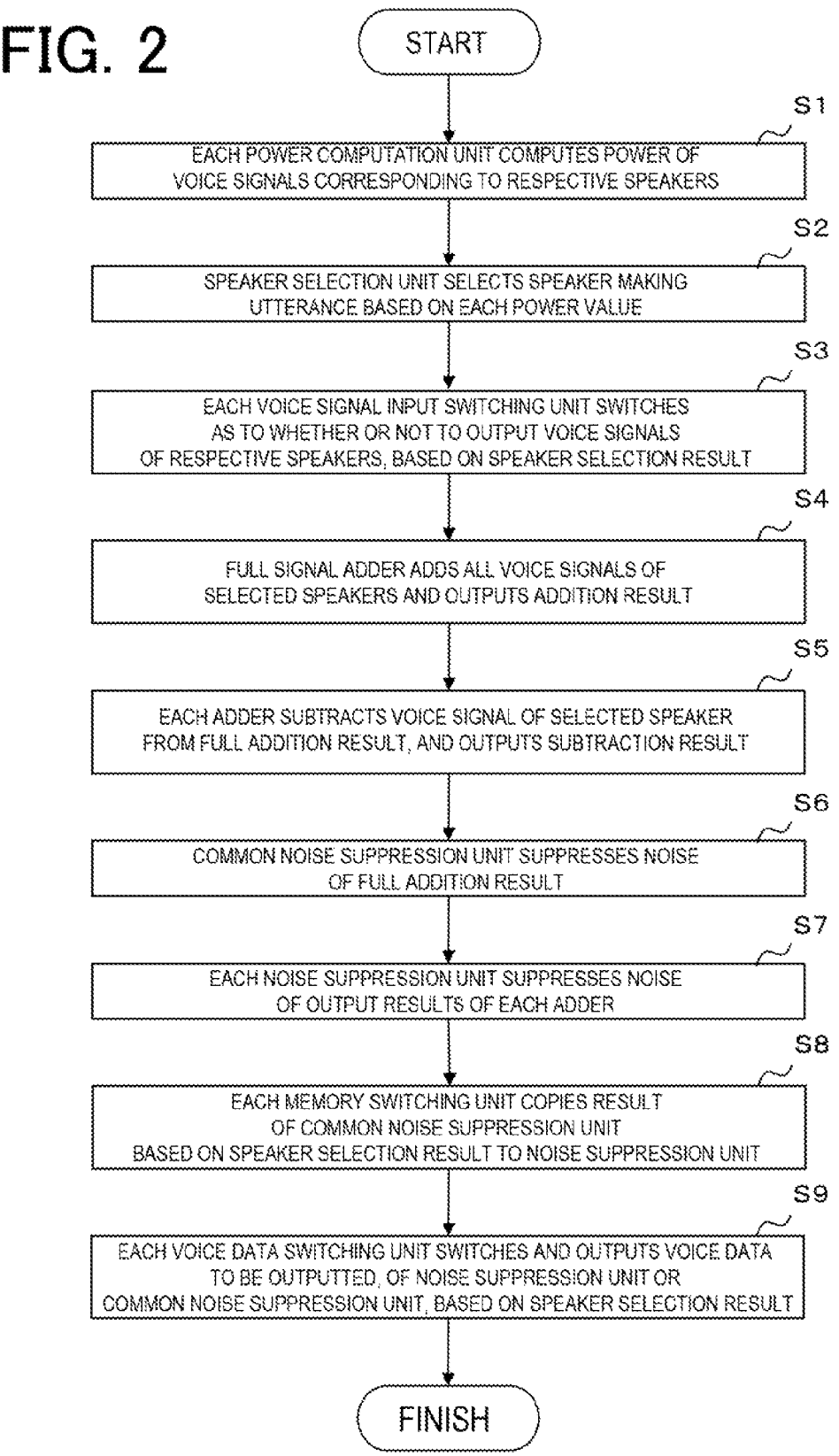
FIG. 2 is a flowchart showing operation of the voice mixing device according to the first exemplary embodiment of the invention.

FIG. 2 is a flowchart showing operation of the voice mixing device according to the first exemplary embodiment of the present invention.

In step S1, the power computation units 111, 112, ... 11M compute power of voice signals corresponding to respective speakers.

In step S2, the speaker selection unit 200 selects a voice signal corresponding to a speaker (a single person or multiple persons) making an utterance, based on each power value.

In step S3, the voice signal input switching units 121, 122, ... 12M make a switch as to whether or not to output voice signals of respective speakers, based on a speaker selection result.

In step S4, the full signal adder 300 adds all voice signals of a selected speaker or speakers (a single person or multiple persons), and outputs an addition result.

In step S5, the adders 131, 132, ... 13M subtract respective voice signals of each selected speaker from the full addition result, and output subtraction results.

In step S6, the common noise suppression unit 400 suppresses noise of the full addition result.

In step S7, each of the noise suppression units 141, 142, ... 14M suppresses noise of output result of the respective one of adders 131, 132, ... 13M.

In step S8, the memory switching units 151, 152, ... 15M copy results of the common noise suppression unit 400 based on respective selection results of each speaker, to respective noise suppression units 141, 142, ... 14M.

In step S9, each of the voice data switching units 161, 162, ... 16M switches and outputs voice data to be outputted, of respective one of the noise suppression units 141, 142, ... 14M or the common noise suppression unit 400, based on respective one of speaker selection results with regard to each speaker.

In steps S1 and S2, selection of the voice signal may be made based on whether the voice signal is voiced or is unvoiced.

Furthermore, a voice signal of a speaker otherwise (specifically) indicated may be mixed.

In addition, a voice mixing device may be realized by making a computer, comprising a voice mixing device for mixing a plurality of voice signals as above, execute a program.

Second Exemplary Embodiment

Figure 3:
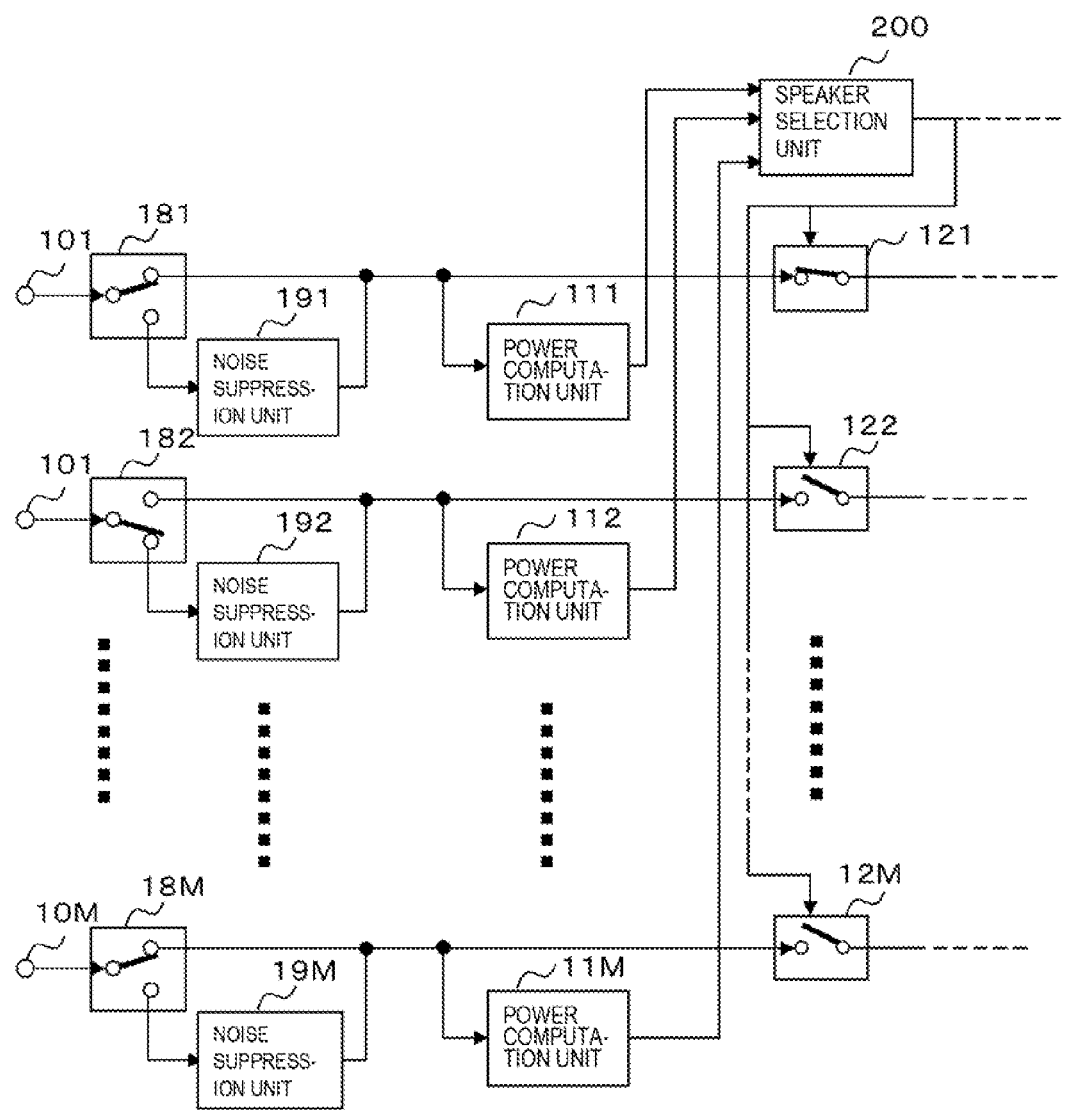
FIG. 3 is a drawing showing a configuration of a voice mixing device according to a second exemplary embodiment of the invention.
Figure 4:
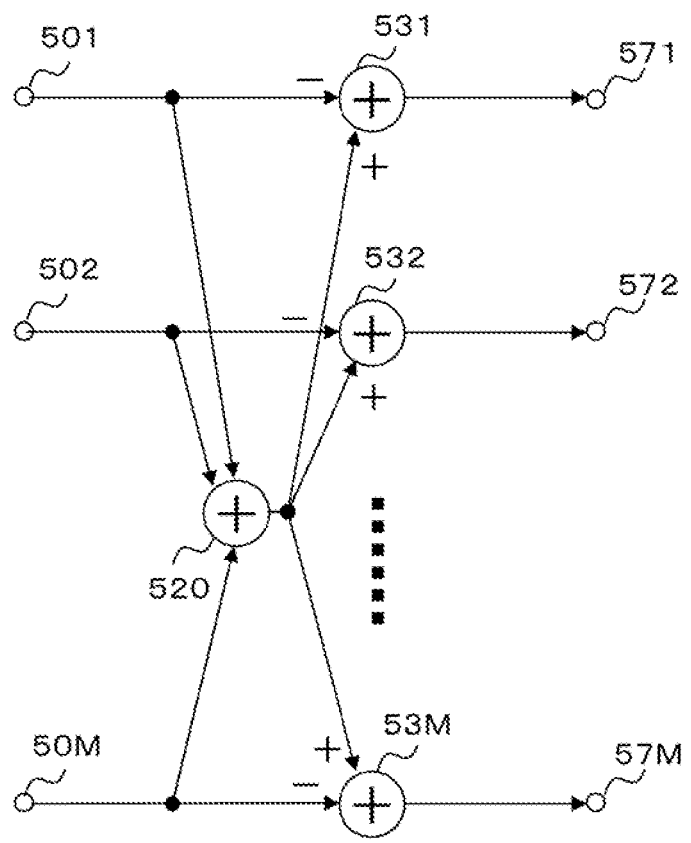
FIG. 4 is a drawing showing a configuration of a conventional voice mixing device.

FIG. 3 is a block diagram showing a configuration of a voice mixing device according to a second exemplary embodiment of the present invention. In FIG. 3, noise suppression switching units 181, 182, ... 18M, and noise suppression units (preliminary noise suppression units) 191, 192, ... 19M are added to the voice mixing device of FIG. 1. Below, in order to simplify the description, only differences from the first exemplary embodiment will be described.

The noise suppression units 181, 182, ... 18M perform switching as to whether to output voice signals inputted from respective voice input terminals 101, 102, ... 10M to the respective noise suppression units 191, 192, ... 19M, or to respective power computation units 111, 112, ... 11M, and voice signal input switching units 121, 122, ... 12M. In cases in which a terminal used by a participant is a mobile telephone, for example, since background noise is considered to be superimposed, by an input signal being inputted to a noise suppression unit, this switching can be set independently for each participant. Specifically, if the first three digits of a telephone number are 090 or 080 indicating a mobile telephone, a method in which it is judged to be a mobile telephone may be used. Or, a method may be considered in which an input signal of a speaker selected in the speaker selection unit 200 is inputted to a noise suppression unit.

The noise suppression units 191, 192, ... 19M suppress noise (i.e., perform noise-suppression process) of inputted voice signals, only in cases in which a voice signal is inputted, and output voice signals in which noise is suppressed to the respective power computation units 111, 112, ... 11M and the voice signal input switching units 121, 122, ... 12M.

Since subsequent operations are the same as the disclosure described in Exemplary Embodiment 1, descriptions will be omitted.

According to the present exemplary embodiment, since noise suppression is performed on an inputted voice signal before mixing, it is possible to increase a noise reduction effect.

The above description was given based on the exemplary embodiments, but the present invention is not limited thereto.

Modifications and adjustments of embodiments and examples are possible within the entire disclosure (including the scope of the claims) of the present invention and additionally based on fundamental technological concepts thereof. Furthermore, various combinations, substitutions and selections of various disclosed elements are possible within the scope of the claims of the present invention.

Further problems to be solved objects and expanded modes of the present invention are clear from the entire disclosure of the present invention including the claims.

What is claimed is:

1. A voice mixing device for mixing a plurality of voice signals, comprising:
    a speaker selection unit selecting at least one voice signal among said plurality of voice signals;
    a full signal adder unit adding all of at least one voice signal selected by said speaker selection unit;
    respective subtractor unit subtracting only one of said selected voice signals from an addition result of said full signal adder unit;
    a common noise suppression unit suppressing noise of a common voice signal, being an addition result of said full signal adder unit;
    individual noise suppression unit suppressing noise of respective individual voice signals, being subtraction results of said subtractor unit; and
    memory switching unit copying information of noise suppression obtained in said common noise suppression unit based on a selection result of said speaker selection unit, to information of noise suppression in said individual noise suppression unit.

2. The voice mixing device according to claim 1, further comprising a voice data switching unit switching and outputting a voice signal in which noise is suppressed, obtained by any one of said common noise suppression unit and said individual noise suppression unit, based on a selection result of said speaker selection unit.

3. The voice mixing device according to claim 1, further comprising a preliminary noise suppression unit enabling selection as to whether or not to perform noise suppression on each of said plurality of voice signals.

4. The voice mixing device according to claim 1, wherein said speaker selection unit selects said at least one voice signal based on power of said voice signal.

5. The voice mixing device according to claim 1 wherein said speaker selection unit selects said at least one voice signal based on whether said voice signal is voiced or unvoiced.

6. A multipoint conference system, comprising said voice mixing device according to claim 1.

7. A noise suppression method used in a voice mixing device for mixing a plurality of voice signals, the method comprising:
    selecting at least one voice signal among said plurality of voice signals, termed as a first step;
    adding all of at least one voice signal selected in said first step, termed as a second step;
    subtracting only one of said selected voice signals from an addition result of said second step, termed as a third step;
    suppressing noise of a common voice signal, being an addition result of said second step, termed as a fourth step;
    suppressing noise of an individual voice signal, being a subtraction result of said third step, termed as a fifth step; and
    copying information of noise suppression obtained in said fourth step based on a selection result of said first step, to information of noise suppression of said fifth step, termed as a sixth step.

8. The noise suppression method according to claim 7, further comprising switching and outputting a voice signal in which noise is suppressed, obtained in any one of said fourth step and said fifth step, based on a selection result of said first step, termed as a seventh step.

9. The noise suppression method according to claim 7, further comprising selecting whether or not to perform noise suppression on each of said plurality of voice signals, before said first step, termed as an eighth step.

10. The noise suppression method according to claim 7, wherein, in said first step, said at least one voice signal is selected based on power of said voice signal.

11. The noise suppression method according to claim 7, wherein, in said first step, said at least one voice signal is selected based on whether said voice signal is voiced or unvoiced.

* * * * *